Dec. 1, 1925. Re. 16,218

J. K. DARBY

PAPER MAKING MACHINE

Original Filed Jan. 10, 1918. 4 Sheets-Sheet 1

INVENTOR
James K. Darby
BY
Darby & Darby
his ATTORNEYS

Dec. 1, 1925. Re. 16,218
J. K. DARBY
PAPER MAKING MACHINE
Original Filed Jan. 10, 1918 4 Sheets-Sheet 2
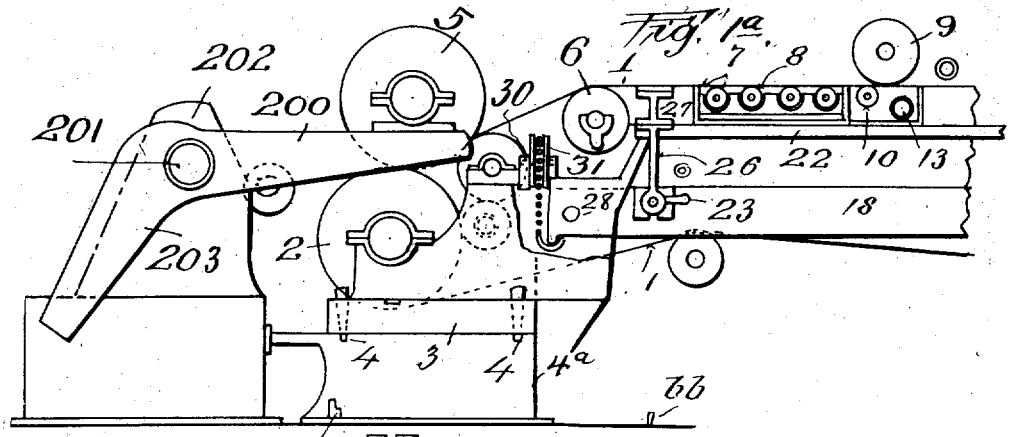
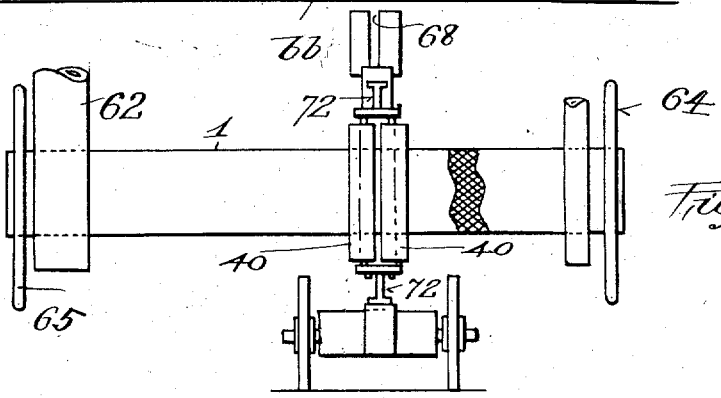
Fig. 8
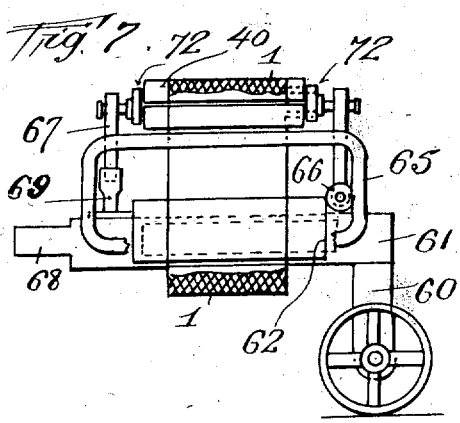
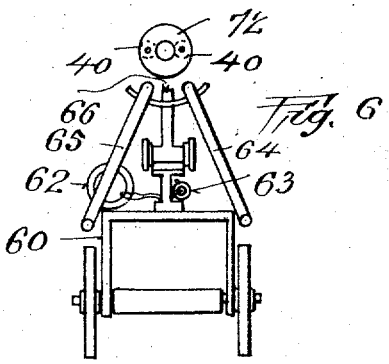
Fig. 6
INVENTOR
James K. Darby
BY Darby & Darby
his ATTORNEYS Dec. 1, 1925. Re. 16,218
J. K. DARBY
PAPER MAKING MACHINE
Original Filed Jan. 10, 1918 4 Sheets-Sheet 3
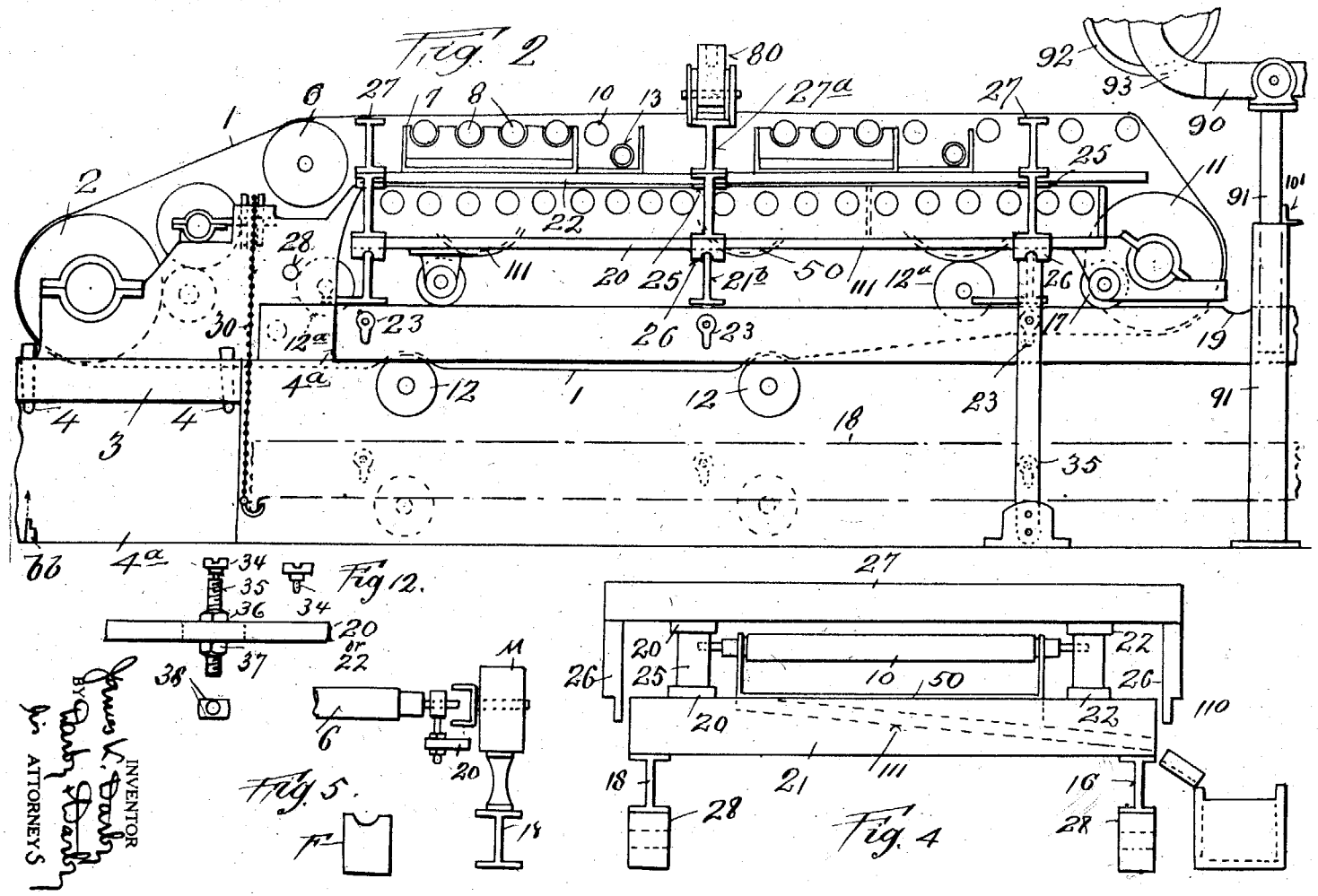
INVENTOR
James K. Darby
BY Darby & Darby
his ATTORNEYS Dec. 1, 1925. Re. 16,218
J. K. DARBY
PAPER MAKING MACHINE
Original Filed Jan. 10, 1918 4 Sheets-Sheet 4
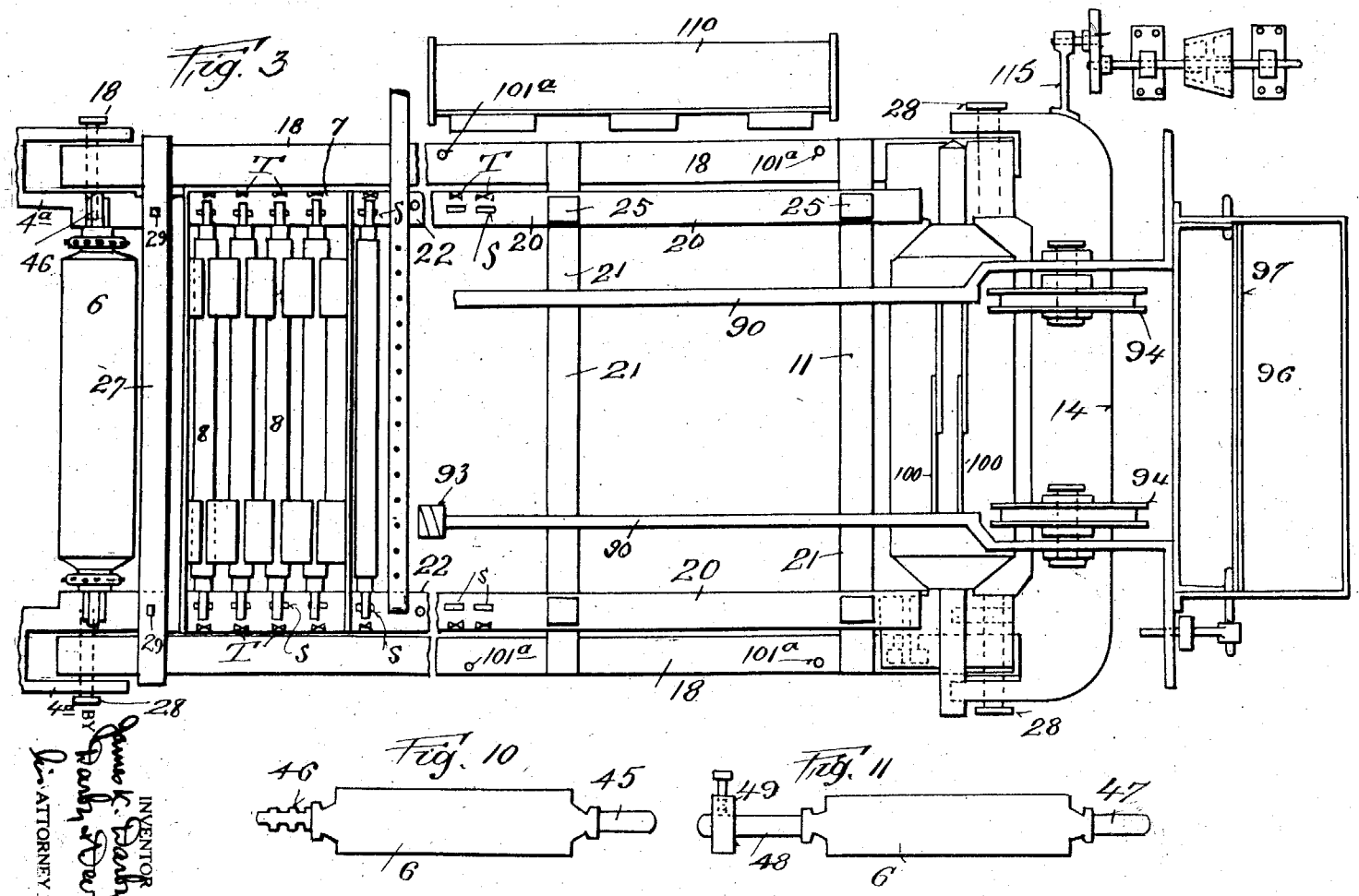
INVENTOR
James K. Darby
BY Darby & Darby
his ATTORNEYS Reissued Dec. 1, 1925. Re. 16,218

UNITED STATES PATENT OFFICE.

JAMES K. DARBY, OF DAYTON, OHIO, ASSIGNOR TO THE BAGLEY AND SEWALL COMPANY, OF WATERTOWN, NEW YORK, A CORPORATION OF NEW YORK.

PAPER-MAKING MACHINE.

Original No. 1,436,240, dated November 21, 1922, Serial No. 211,138, filed January 10, 1918. Application for reissue filed July 3, 1924. Serial No. 724,128.

*To all whom it may concern:*

Be it known that I, JAMES K. DARBY, a citizen of the United States, residing at Dayton, county of Montgomery, State of Ohio, have made a certain new and useful Invention in Paper-Making Machines, of which the following is a specification.

This invention relates to paper making machines.

The object of the invention is to provide a paper making machine which is simple in structure, efficient in operation and economical of manufacture and maintenance.

Further object of the invention is to provide a paper making machine so constructed as to allow the ready renewal of the forming wire without removing any rolls from the machine.

A further object of the invention is to provide a simple, quick and easy wire replacing apparatus.

A further object of the invention is to provide a paper making machine so constructed as to allow the ready renewal of the forming wire without removing any rolls from the machine and to level, line and clean the rolls while in their usual position.

Further objects of the invention will appear more fully hereinafter.

The invention consists substantially in the construction, combination, location and relative arrangement of parts, all as will be more fully hereinafter set forth, as shown by the accompanying drawing and finally pointed out in the appended claims.

Referring to the drawing:

Fig. 2 is a similar view, showing the machine doubled up in accordance with my invention.

Fig. 3 is a view of the respective ends of the paper making machine.

Fig. 4 is an end elevation of the table and rail employed in accordance with my invention.

Fig. 5 is a similar view of a bearing employed in accordance with my invention.

Fig. 6 is a view in side elevation of a wire truck employed in accordance with my invention.

Fig. 7 is a view in side elevation of the same.

Fig. 8 is a top plan view of the same.

Figs. 10 and 11 are detail views in elevation of guide rolls and bearings.

Fig. 12 is a detail view of an adjustable bearing arrangement employed in accordance with my invention.

The same part is designated by the same reference numeral wherever it occurs throughout the several views.

Figure 1:
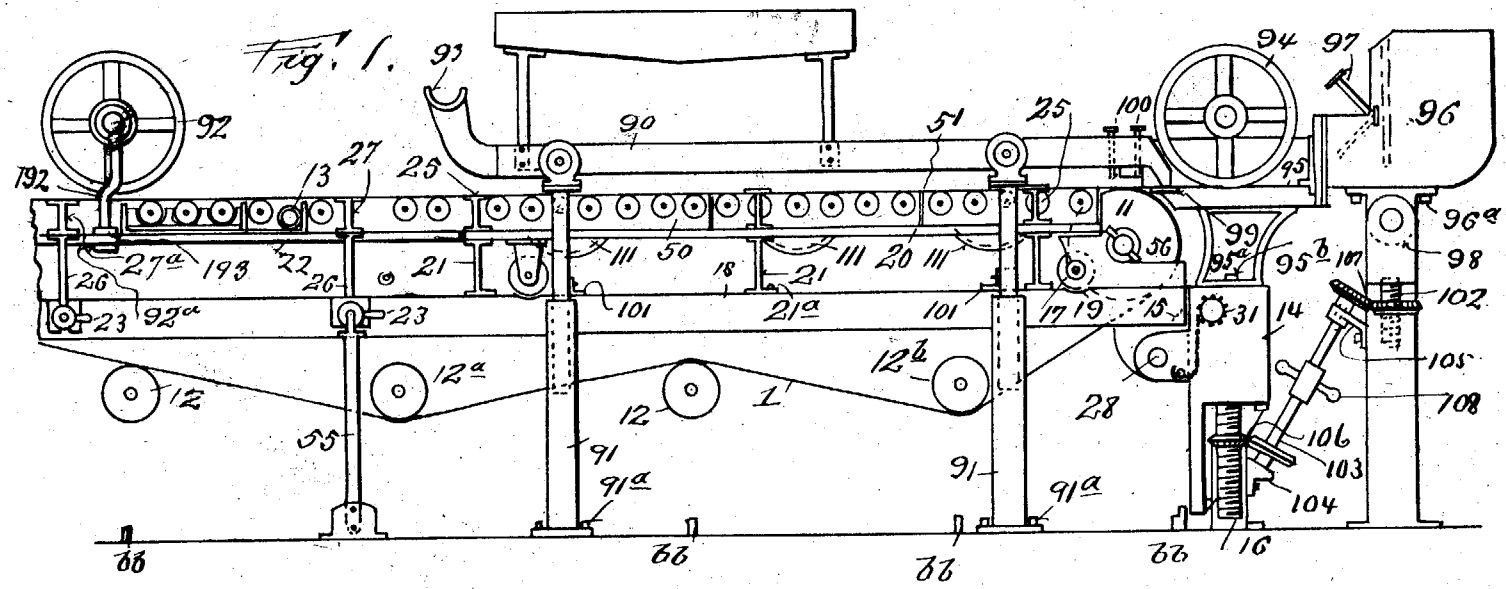
Fig. 1 is a view in elevation of the breast end of a paper making machine, Figs. 1 and 1ª placed end to end constituting the entire machine.

Referring to Figs. 1 and 1ª the combination of which shows a usual structure, of Fourdrinier machine, 1 designates the endless wire, 2 the bottom couch roll located in block 3 and held therein by pins 4 supported by the couch side housing 4ª. 5 designates the top couch roll and 6 a guide roll. The latter is also supported by suitable bearings in the couch side housing. The upper couch roll 5 is normally supported in its operative position with respect to the lower couch roll 2, as shown in Fig. 1ª, by means of a bearing formed, for example as one illustration of the invention, at one end of a frame 200 which is pivotally supported as at 201 by a stationary frame 202. The other end 203 of this frame permits means, upon counterclockwise movement around the pivot 201 in the form shown, for moving the upper couch roll 5 away from the remainder of the machine, i. e., away from the breast roll. Suction boxes 7 are provided with the suction box table rolls 8 and wire 1 passes thereover and beneath the dandy roll 9 and over table rolls 10. 11 designates the breast roll and 12 the carrying rolls disposed beneath the table, one of which, for example, as designated at 12ª, may be a stretching roll to maintain the wire 1 taut. A water connection for the suction boxes 7 is shown at 13. The housing for the breast roll is shown at 14 and is provided with a boss 15 thereon for the purpose which will be hereinafter described. The housing 14 is provided with a screw 16 for adjusting the forming elevation of the wire as is usual and well understood. Reference character 17 designates the wheels for the truck end of the table, which operate on the supporting rail 18 therefor, which rail 18 is provided with a notch or depression 19, in which the wheels 17 are normally suspended, relieving the wheels of all weight when the paper machine is in position for operation as shown in Figs. 1 and 1ª. The supporting rails 18 on opposite sides of the machine extend from the breast roll housing 14 to the couch side housing 4ª and are locked to the housings 14 and 4ª by the lock pin 28 as shown best in Fig. 3. The table rails 20 and 22 on opposite sides of the machine extend from the breast roll 11 to the guide roll 6 and are in two sections as shown, the breast roll end of the table rails on opposite sides of the machine being designated 20 while the couch roll end of the table rails on opposite sides of the machine being designated 22. At the breast end of the machine the table rails 20 are connected by means of the cross beams 21 passing under the rails 20 and resting on the rails 18, see Figs. 1 and 1ª. The tops of table rails 20 are provided with blocks 25 above or in line with the cross beams 21. It will be noticed in Figs. 1 and 1ª that the blocks 25 on the table rails 20 extend above the wire 1 elevation as formed by the table rolls 10. The reason for this arrangement will be described hereinafter. The table rails 22 at the couch end of the machine are supported by means of the cross beams 27 which in turn are supported by rails 18 and blocks 26 which are fastened to the rails 18 by locking devices 23, see Figs. 1, 1ª, 2 and 4. A chain hoist 30, mounted on a suitable pulley 31 is provided at each end of the machine and supported by the frame work thereof for a purpose which will be more fully hereinafter set forth. The foregoing briefly enumerates the various parts which go towards making up the Fourdrinier machine of the usual construction, the forming wire 1 being made usually of copper wire, woven in an endless belt passing around the various rolls, as the paper forms on the table of the machine. The wire 1 is so constructed for the purposes required that it is very easily broken, and in fact can be destroyed with the tip of the finger. These wires are usually from 60″ to 232″ in width and travel as fast as 800′ per minute. From this it is obvious to maintain the forming wire in operative condition, the same must be handled with extreme care to guard against possible destruction or injury, which necessitates winding a new wire on the apparatus, involving littering up the machine and great waste of time, labor and expense. It is customary in stringing the wire 1 on the Fourdrinier to remove all of the rolls of the machine with the exception of the bottom couch roll, then lifting the front end of roll 2 by removing the supports therefrom, slip the wire 1, previously wound on long poles, for instance, as shown at 40, Fig. 8, over the roll 2, then stretch the wire back to the breast roll 11, and then replace all the rolls, suction boxes, and savealls by passing them through the wire 1. Should any mishap occur, the wire 1 is damaged beyond use or, at the best, has a very short life on the machine, giving a great deal of trouble and involving a great waste in defective paper, in the continuous operation of the machine and involving a vast expense as the wires now in use cost from one hundred to a thousand dollars each. All this is in addition to the time required to replace the wire with an undamaged one, which in practice, takes from two to three hours, at the least, and as the productive value of the machine in normal time is from one hundred and fifty to approximately four hundred and fifty dollars per hour, this loss it will be seen is enormous, especially when it is considered that the normal life of a wire is from six to eighteen days. Likewise, in removing the various rolls from the machine, should any one roll receive a small nick or dent, or other defacing mar, this nick or dent, or other defacing mar, will destroy the wire in operation and in fact any and all wires that may be subsequently installed until the nick, dent or other defacing mar is removed from the roll. This may be more apparent when it is considered that practically all of the rolls and in fact the entire Fourdrinier parts are constructed preferably of copper or brass.

It is among the special purposes of my present invention to provide means to string the endless wire 1 without taking the rolls from the frame of the machine, thereby eliminating any danger of the rolls being damaged by handling and in addition thereto to reduce to a minimum the possibility of injury to the wire itself and still further in addition thereto to reduce the length of time required for the replacing of a damaged or faulty wire, to a very short time and with a minimum amount of labor involved. As illustrative of the principle of the invention involved and referring to Figs. 1 and 1ª, the Fourdrinier parts are in position as shown in these figures.

The Fourdrinier proper may conveniently be divided into two parts; the breast roll or truck end and the couch end. The former consists of the breast roll 11, breast roll bearings 56, wheels 17, table rails 20, cross beams 21, connecting table rails 20, blocks 25 on top side of table rails 20, in line with cross beams 21 as shown, savealls 50, partitions 51, gate system 52, 53 and 54, troughs 111 and table rolls 10.

The couch end consists of the bottom couch roll 2, the removable block 3, taper pins 4, couch side housing 4ᵃ, top couch roll 5, bottom couch roll 2, guide roll 6, suction boxes 7, table rolls 8, water connections 13, blocks 26, (in line with the cross beams 27 and connecting table rails 22), jury post 55 (for temporarily supporting the table rails 22 at one end) and deckle pulleys 92 with suitable bearings 92ᵃ, consisting of a journaled bearing having an adjustable stanchion 192, which is threaded to receive lock-nuts 193, for holding the stanchion in the table rail 22. Bolts 29 (Fig. 3) connect the table rails 22 to the housings 4ᵃ, for holding this part of the housing in position and to prevent tipping when the removable block 3 is displaced and the dandy roll 9 and stand removed for restringing the wire.

Rails 18 may conveniently extend from the couch housing 4ᵃ to the breast roll housing 14 and be locked thereto respectively by lock pins 28. These rails support the breast or truck end of the machine and the cross beams 21 rest thereon and are securely bolted thereto by the bolts 21ᵃ. At the couch end of the table blocks 26 extend from the cross beams 27, above the rails 22 to the rail 18, and are lock-bolted thereto at 23.

To replace an old wire with a new one, the old wire is first removed from the machine in any convenient or ordinary manner. The ordinary way is to break the wire, generally across the face of the lower couch roll, by cutting the same, or in any other way, and the machine is operated so that the wire is discharged from the machine at the couch end. The next step in the process of restringing consists in rocking the support of the upper couch roll 5 by means of the arm 203 and bearing 200 pivotally supported intermediate its ends, as hereinbefore described and shown in Fig. 1ᵃ. This operation swings the upper couch roll 5 away from the remainder of the machine, i. e., away from the breast roll, and thereby enables a complete breaking of the front face of the machine throughout its entire length and permits the new wire to be passed over the entire machine in the form of an elongated loop, the dimensions of which will depend upon the degree of relative movement of one part of the machine with respect to the other, as will be more fully hereinafter described and which, as will be readily apparent, can be controlled at will. It is obvious, of course, that the couch roll 5, once swung out of its normal position, will be retained there during the restringing operation in any suitable manner, for example by blocking the same.

If it is now desired to restring the wire, lock-bolts 21ᵃ and 23 are removed and the jury posts 55 placed in the position shown in Figs. 1 and 1ᵃ, for the purpose of supporting the table rails 22 at one of the blocks 26. The chain hoist 30, operated by pulleys 31, now engages the rails 18 at both ends (as shown in Figs. 1 and 1ᵃ) and takes the weight from the lockbolts 28. Lock-bolts 28 are then removed at both ends of rails 18. The couch ends of the table rails are now supported by the couch housing 4ᵃ. The jury posts 55 support the other ends of the rails and hold the couch end of the table in the position shown in Fig 2. All the lockbolts having been removed, the rails 18 are supported by the chain hoists 30, and rails 18, in turn, support the truck end by means of the cross beams 21.

Previous mention has been made of notches or depressions 19 in the rails 18, in which the wheels 17 of the truck end are normally suspended. The rails 18 are lowered by means of the chain hoist 30, and the truck end, supported free on the rails 18, also lowers with the rails until the breast roll bearing 56 strikes the boss 15 fastened to the breast roll housing 14. This causes the truck end to slide forward on cross beam 21 along the rails 18, until the truck wheels 17, normally in the notches 19 of the rails 18, lift out of the notches 19 and in so doing take the weight from the truck end and of the cross beams 21, thereby causing the truck end to be supported on the wheels 17.

The deckle pulley 92 and stanchion bearing 92ᵃ are now taken from their normal position, as shown in Figs. 1 and 1ᵃ, and placed on the auxiliary bearing 93, situated on the ruler bar 90 of the deckle frame.

The truck end of the machine now rides on the wheels 17 and is lowered a sufficient distance, by hoists 30, to enable the truck end to be passed forward under the couch end to the position shown in Fig. 2. With the truck end lowered, and shoved forward under the couch end, the machine is doubled up so that the blocks 25 on top of rail 20 rest on the bottom of the rail 22, spacing the rails 20 and 22 apart, so that in lifting the frames and rolls together no pressure will bear on any of the rolls.

By thus telescoping the Fourdrinier as described above, I have reduced the extreme normal distance between the couch roll 2 and the breast roll 11, about one-half, thus giving me a better working clearance in stringing the wire; also giving a better advantage for lifting the frame as the slack wire is slipped over the face of the rolls.

Furthermore, owing to the increased weight of the wire used on wide, high speed modern paper machines, I provide special means for carrying said wire across the face of the machine rolls, and also for removing the same from the shipping crate, and I will now describe this special means. By this means I am enabled to place the wire over all the rolls of the paper machine without removing the rolls from the frame, and this special means will hereinafter be known as the wire truck. This wire truck (see Figs. 6, 7 and 8) consists of a main frame 60, integrally supporting a beam 61. This beam supports a couch lift 62, a breast roll lift 63, spreader pipes 64 and 65, dolly truck 66, post bearing 67, socket stand 69 (for said post bearing 67) and revoluble journaled plates 72 which are provided with screws for the purpose of securing the plates to the two poles 40, and on which poles the wire is wound. The journal plates 72 are supported by bearings on the dolly truck and post bearing 67. The post bearing is secured in the socket stand 69 on the beam 61 and the dolly truck rides on the beam 61 of the truck 60. A second truck 80 (see Fig. 2) is equipped with a socket bearing and is supported on the central cross beam 27ᵃ. This truck receives the post bearing 67 on being removed from the socket stand 69. Therefore, in passing the wire over the face of the rolls, the dolly truck 66, post bearing 67 and truck 80 (supporting the journaled plates 72 secured to poles 40) form a wire spool, by which name this assembly shall hereinafter be known.

The parts of the Fourdrinier being in the position shown in Fig. 2, the wire truck 60 as shown in Figs. 6 and 7 is brought forward to the place where the forked end 68, of beam 61, on truck 60, meshes into the cross beam 21 at 21ᵇ of the truck end. The wire truck 60 being now positioned in line with the centre sections of the cross beams and blocks, supports the table rolls, suction boxes, rails, cross beams and blocks on the front side while the wire is carried across the face of the rolls. The couch lift 62 is then taken from the wire truck 60 and carried in line with the couch roll 2 and being hollow is slipped over the journal of couch roll 2 for an extension lift. The wire now unwinds from the wire spool as the couch lift 62 is carried to the couch roll journal. The breast lift 63 is now removed from the wire truck 60 and carried in line with the breast roll journal 11, the same being hollow is also slipped over the said roll journal as an auxiliary extension lift. The new wire thus assumes the shape of an extended loop, the center portion of which is supported by the wire rolls 40 and the bight of each end of the loop being supported by the spreaders 64 and 65, the breast lift 63 extending through the bight of the loop which is supported by the spreader 64 and the couch lift 62 extending through the bight of the loop which is supported by the spreader 65.

On referring to the drawings, Figs. 1, 1ᵃ and 2, it will be noted that the box bearings of the couch and breast roll journals are capped, so that in lifting the said rolls any part of the frame that is fastened to the housings at the said box bearing also lifts with the rolls 2 and 11. It will be understood that when the auxiliary supports at the couch 62, breast 63 and truck 60 are in place, that as the front side of the frames and rolls are lifted at the same time, the auxiliary lifts brace each other by the three point suspension. At this stage breast roll 11 is in the desired position, therefore the breast auxiliary lift 63, by placing a post (not shown) under the outer end of said lift, sustains roll 11 and any connections. As the truck beam 61 has been meshed at the forked end 68, into the cross beam 21 of the truck end at the central cross beam 21ᵇ, and as that part of the frame between the breast roll 11 and couch housing 4ᵃ is also at the proper elevation, the truck beam 61, supported on the truck wheels 60, sustains the frame as an auxiliary lift. By this means it will be understood that the breast auxiliary lift 63, and the truck auxiliary lift 61, hold their part of the load suspended, as the rail 18, supported by the chain hoist 30, which has been carrying the load, is lowered to the foundation plates, the chain of the hoist 30 is taken out of the way.

It will be understood that to place the wire across the face of the rolls a clear passage of the frame is necessary and for this purpose the removable block 3 and attached parts are removed. The spreader pipe 64 is now carried to the breast end of the wire loop, and spreader pipe 65 is taken to the couch end. The jury post 55 is now taken out of the way, the wire spool on the beam 61 is now ready to carry the wire across the machine by the following method:

As the truck beam 61 engages the cross beam 21 at 21ᵇ, the cross beam 27 at 27ᵃ is also in line with the truck beam 61, the wire spool is supported on the truck beam 61, by means of the dolly truck 66, and post bearing 67 in the socket stand 69. Post bearing 67 is now removed from the socket stand 69 and placed in the socket of truck 80 (Fig. 2). The wire spool is now riding on the two trucks 66 and 80, on the truck beam 61, and cross beam 27ᵃ. The spreader pipes 65 at the couch end of the wire loop, and the spreader pipes 64 at the breast end of the wire loop now spreads the wire so that it will not foul the ends of the rolls or the frame. The wire spool is now pushed across the machine riding on trucks 66 and 80, and as the wire spool is moved across the machine to the desired position, the spreader pipes 64 and 65 are carried across with the wire looped at their respective ends.

To one skilled in the art, it is apparent that the wire truck arrangement is flexible and that as the poles are frequently longer than the wire and project beyond the edges thereof, my wire truck is suitable for large or small machines. This has never been done before and is a great advantage as well as saving of considerable expense where different sizes of machines have to be rewired.

To reassemble the machine after the wire is thus put in place, the block 3 under the roll 2 is replaced and fastened in position by means of the pins 4; the chain hoist 30 is again fastened to the rails 18, the jury post 55 is again swung into place, the rails 18 are raised by means of the hoist 30 so as to take the weight of the truck end, the wire truck 60, breast lift 63, and couch lift 62 are then removed and again the machine is in the position and condition with respect to the various elements, as shown in Fig. 2 ready to be extended to its proper position by a reversal of the operation hereinbefore described, which proper position is shown by the combined Figs. 1 and 1ª. The spread pipes 64, 65, which were extending through the wire 1 are then taken out of the way.

In stringing the wire 1 at the present time great care must be taken that the wire is not damaged in any way, and also that the wire must be strung true and in line so that during the operation of the machine, the same will travel in a perfectly straight line, thus preventing excess of wearing on the edges of the wire.

The wire being slipped over the rolls, as shown in Fig. 2, by the slack irregular line I, the wire spool, supported by trucks 80 and 66, is then in position to unwind as the truck end is carefully moved back to the position shown by the combined Figs. 1 and 1ª. Thereupon the wire 1 on the spool unwinds until all of the wire 1 is off of the wire poles 40, one of the poles 40 being on the inside of wire 1, is passed through and both poles 40 being now empty are removed with the trucks 66 and 80. The wire 1 now has more or less slack and it is at this point that I provide means for insuring that the wire is put on straight and in true alignment. To insure the wire 1 being put on straight so as to run in a true line, the couch roll 2, breast roll 11, also several of the rolls interposed between these two rolls, are preferably provided with a ring marked on or near the ends of the faces thereof, showing a true line for the edge of the wire 1 to follow as the truck end is moved back to its proper position, thus insuring a proper alignment of the wire on the rolls.

I also provide a means to keep all of the rolls in proper alignment and level while the paper making machine is in operation. Even when the paper making machine is in operation, it can be accurately determined what rolls are in alignment. In the present form of Fourdrinier machines, it is necessary and customary to remove all of the rolls from the machine except the couch roll 2 and breast roll 11 in placing the rolls in alignment, and should a roll get out of alignment, it often spoils the wire and several wires which are successively employed thereon until the rolls are re-aligned in their proper position. In my present machine after the couch roll 2 and breast roll 11 are placed in a proper position a boss *bb* is fastened permanently to the foundation plates on the front and back sides and so located thereon that a plumb bob line dropped from the face of the couch roll 2 and the breast roll 11 coincides therewith, so that it is easy to determine whether or not the couch roll 2 and the breast roll 11 are in accurate position. This arrangement has a number of advantages over the present customary method which consists in first lining the couch roll 2 and then line the breast roll 11 with roll 2 by passing a line around both rolls 2 and 11, as the present method requires considerable skill. I also place on the foundation plates, additional bosses *bb* beneath rolls 12. The journals being accessible I strike a line through the center of the journals. The table rolls 8 and 10 supported on the table rail 20 have extended journals so that the bearings are supported on the table rail 20 which is slotted to allow for adjustment to right or left as shown at S. Central with the slots are marks indicated at T placed on the rail 20 central to the extending journals of the rolls 8 and 10. The caliper feeler F placed on the rail 20 at the marks T is moved under the extending journals of the rolls 8 and 10 and proves that the rolls 8 and 10 are in line and level as will be readily understood. Should the caliper feeler F prove that any roll 8 or 10 is out of line or level on the rail 20, the operator loosens the lock nuts that hold the bearings of the rolls 8 or 10 to the rail 20, moves the roll to the proper line or level and again locks the bearings to the rail. At the present time, it is customary to place the stem of the bearings of the rolls 8 and 10 into a hole drilled into rails 20 allowing no adjustment to the right or left but merely a vertical adjustment by means of a set screw and lock nut fastened under the rail 20 which parts, being the present well known parts of a Fourdrinier machine are not shown. As the bearings wear, they are adjusted vertically, as desired, but as the stem of the bearings often fits loosely in the rails 20 the bearings wobble, the rolls 8 and 10 run out of line, crowd at the shoulders of the journals, the journals become sprung, thereby causing the rolls to wobble in their bearings and jump, causing marks or a weak spot in the paper, which causes the paper to break. Often the rolls 8 or 10 stop turning, which causes the wire 1 to wear a flat side on the rolls so that if the rolls start to turn again in this condition they mark the paper and wear ridges in the wire 1, causing the wire to have a very short life. To overcome this recognized objection to the present type of Fourdrinier machines, I place a hollow tube 35, see Fig. 12, threaded on the outside and flattened on two sides 38 to slide in the slots S, of rails 20 and 22. Placed on the hollow tube 35 are two lock nuts 36, 37, locking the tube 35 securely to the rails 20 and 22. At 34 is shown a bearing of table rolls 8 and 10 which sets into the hollow tube 35 and is the same as the bearings now in use. By this arrangement no matter how high the bearing 34 is required to be raised the hollow tube 35 is locked securely to rails 20 and 22 and cannot wobble.

Also by means of the small motor M on the rail 18 (see Fig. 5) means are provided for turning the rolls by power. My reasons for this arrangement are as follows. In paper making operation, certain chemicals acting with the water employed cause the rolls to corrode, and if there is any scale or corrosion on the face of the rolls it has a tendency to cause the wire to become defective. It is the present method to use acids, or before replacing a wire to scrape the corroding scale off of the roll. I propose, before replacing a wire, to attach a small motor to the end of any of the journals and sand paper the rolls off by power, without taking the rolls out of the frame of the machine. It is understood that the motor is removed when the machine is in operation.

At the breast and above the Fourdrinier table is located the deckle frame consisting of the ruler bar 90, supporting side posts 91, deckle pulleys 94, breast board 95, head box 96, slicer 97, adjustable supports 98, brass plates 99, and the wire slicer 100, auxiliary bearing 93 and pulleys 92.

Referring to Figs. 1 and 1[a], it will be noticed that the posts 91 are made adjustable, so that the posts can be adjusted to any desired length. The smallest end of the posts 91 slide in and out. Fastened to the upper part of the post 91 is an angle plate 101. The purpose of this angle plate is threefold. First, in lowering the breast end of the machine, when about to put on a wire, the deckle frame will also lower, but I provide an angle plate 101 fastened to the upper section of the adjustable post 91 so that in lowering the table rails 20 the deckle frame also lowers until the angle plate 101 rests on the shoulder of the lower section of the adjustable post 91, where the deckle frame rests while telescoping the table frame as hereinbefore described. The boss or angle plate 101 rests on the rail 18 should the machine be of the shakeless deckle type. While the angle plate is not fastened to the rail 18, the rail by means of the angle plate at all times supports the deckle frame when the machine is in operation, whether or not the deckle frame is vibrated. As the rails 18 support rails 20 and 22 any change in elevation of rails 18 changes rails 20 and 22, and changes the elevation of the deckle frame as well. The rails 20 and 22 support the table rolls 8 and 10. The rolls 8 and 10 with the wire 1 comprise the forming table over which the paper flows. The slicers 100 attached to the deckle frame therefore adjust themselves with the rails 20, 22 and 18.

The deckle frame, breast board 95, head box 96, are all coupled together. The breast board 95 rests lightly on the housing 14 and is supported by the adjustable post 98 with the screws 102 and 16 coupled together, to afford adjustment of elevation of the breast end of the machine. The adjustable arrangement consists of the breast housing screw 16, head box screw 102 connected by the shaft 103, supported by brackets 104 and 105. At the breast housing end of the shaft 103, the gears 106 engage the screw 16. At the head box end of the shaft 103 the gears 107 engage the screw 102. The shaft 103 is operated, as shown, by the hand wheel 108. The screws 16 and 102 being of the same pitch, and the gears 106, 107 being of the same ratio, the adjustment between the housing 14 and the head box 96 is exact. The deckle frame and head box are independent of the vibrating motion of the Fourdrinier table, and the adjustable posts 98, relieving the weight of the head box 96, takes the weight off of the housing 14, as will be readily understood.

The Fourdrinier parts at the breast end of the machine, vibrate from side to side, a suitable arrangement being shown at 115. As shown in the drawing (Fig. 3) the shaker 115 is attached to the breast housing 14, and as the breast housing 14 supports the rails 18, by means of the lockbolt 28, the rails 18 also vibrate with the breast housing 14, and as the rails 18 support the rails 20 and 22, of the wire forming table, the vibrating motion is conveyed to the wire forming table rails 20 and 22 by the rails 18. Therefore, both the rails 18, 20 and 22 vibrate by the shaker arrangement.

Previous mention has been made to the angle plate 101 fastened to the posts 91 of the deckle frame, and as the posts 91 are telescopic, the angle plate 101 extends over on the rails 18, and when the machine is in a normal running position these angle plates fastened to the upper part of the telescopic post 91, supports the deckle frame by bearing on the rails 18. Therefore the rails 18 adjust the elevation of the deckle frame, by means of the upper section of the telescopic posts 91, supported by the angle plates 101, bearing on the rails 18. This is of vital importance owing to the fact that the slicers 100, which are at times but one-eighth of an inch from the wire, when the machine is in operation, must be adjusted with the forming wire whenever the running elevation of the wire is changed.

When the deckle frame does not vibrate, the lower section of the telescopic posts 91 are fastened to the floor by bolts 91[a], while the angle plates 101 bear on the rails 18, permitting the rails 18 to slide to and fro free beneath the angle plates 101.

If it is now desired to vibrate the deckle frame, the telescopic posts 91 are released at the floor by removing the bolts 91[a]. A breast board bracket 95[a] heretofore bearing lightly on the housing 14 is bolted to the housing 14 at 95[b]. The head box 96, secured to the adjustable post 98, is released from the posts 98 by removing the bolts 96[a]. This permits the head box to slide back and forth on posts 98 as the entire machine vibrates. It will be understood that the elevations of the forming wire, the deckle frame and the head box 96, is at all times regulated by the two elevation screws 16 and 102, and it is absolutely impossible for the forming wire (in changing elevations) to come in contact with the slicer and thus be destroyed whether the deckle and head box vibrate or not.

Reference has been made to the savealls 50 with partitions 51 located beneath the table rolls 10 into which the water used in forming papers filters through the wire 1. The savealls 50 consists of a shallow water-tight box, see Fig. 4, the bottom resting on beam 21 and the sides extending to the same elevation as the forming table, making it possible to submerge the rolls 10 completely. Extending across the savealls 50 are the partitions 51 dividing the savealls into three sections, each section having a trough 111 fastened permanently to the saveall 50. The saveall system forms a part of the truck end of the Fourdrinier and is not removed from the Fourdrinier at any time, but if it should be desired to wash out the savealls before putting on a wire, by removing one or more of the table rolls 8 from their bearings and laying the roll or rolls over on top of the accompanying rolls, enough room will be made to clean the savealls and the troughs as desired.

Figure 9:
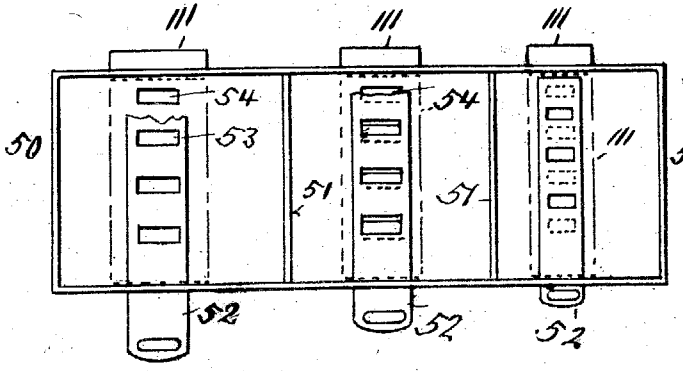
Fig. 9 is a top plan view of the saveall system showing the filter water regulating gates employed in accordance with my invention.

As shown in the drawings, the savealls system vibrates with the Fourdrinier table and as the sides of the savealls 50 are at the same elevation as the wire, the partitions 51 being lower than the forming wire, enough clearance is allowed so that the wire 1 will not be damaged in any way by the partitions. By regulating the flow of water into the savealls and then into the trough 111 the savealls 50 by closing the flow into the trough 111, and as the water cannot escape through the wire 1 into savealls 50, the water passes over the partitions 51, forming a lake on the wire holding the water in the fiber and making the fiber carry up the water to any desired point of the three sections of the saveall system. This has the same effect as changing the forming elevation or changing the nature of the fiber, as in "free" or "slow" stock, the word "free" meaning that the water escapes from the stock easily, and the word "slow" that it does not escape easily. A better understanding of the method of regulating the water within the savealls 50 can be had with reference to Fig. 7 wherein the partitions 51 divide the saveall 50 into three sections. In this view, 52 are the gates, 53 the openings in the gates, 54 the openings in the bottom of the savealls 50, 111 the trough fastened to 50 directly under the openings 54. Referring to Fig. 9 it will be noted that at one section the gate 52 is in such a position as to close all of the openings 54 so that no filter water can flow into the trough 111. At the next section, the gate 52 is positioned to permit the filter water to pass through the partially opened gates 53, through 54, into the trough 111. The next section has the gate 52 wide open so that all filtered water may pass through the openings 53 through 54 into trough 111 then into the vent trough 110.

The advantages of this arrangement embodying my invention are obvious, principal among which being the control at will of the use of various fine grades of paper. In regulating the filter through the wire 1 by flooding the savealls and by flooding that section of the savealls next to the breast roll 11 first and by passing the water over the partitions 51 from one section to the other until the last section from the breast roll 11 is reached, then by letting all the water filtering through the wire 1 escape through the one trough 111 by closing the other troughs, the rush of excess filtered water through the last section 50 into the trough 111 has a tendency to form a siphon and cause a forced suction on the filtered water in turn causing the filtered water to pass through the wire 1 by a force greater than gravity and therefore causing the fibre forming on the wire 1 to give up more water than under natural tendencies. This, of course, causes the fibre to be drier and stronger than otherwise.

The guide roll 6 may be adjusted by the usual automatic arrangement which is not shown in the drawing. Whether or not the guide roll is automatically adjusted the same has always been a source of considerable trouble and I have traced the trouble not to the automatic arrangement, which is generally employed for maintaining the same in alignment, but to the bearings of the guide roll itself. Assuming that the true normal position of the guide roll 6 should be at a true right angle to the line of travel of the wire 1, it must be remembered that the Fourdrinier machines consist of at least 20 rolls, any one of which may get out of line or level and thus the guide rolls 6 by means of the automatic arrangement located at one end hereinbefore mentioned, cause the guide roll to move the carriage, so as to compensate for any part being out of line. The guide roll is moved out of line in a direction opposite to whatever part is out of line throughout the Fourdrinier machine. Thus the guide roll is generally constructed to operate out of line to compensate for any other part of the machine, which through any cause, becomes out of line.

It is a well known fact in practice that when a roll is out of line or alignment, the roll will crowd against one of the bearings, causing the same to become defective and to give considerable trouble. In practice, I have found that when the guide roll is working out of line (and as a general rule it is always out of line) it will crowd against the bearing on one end, and should the same crowd the front side of the Fourdrinier, on which side the automatic arrangement with the carriage is positioned, as is well known in the art, the roll jams the carriage so as to cause the automatic arrangement to work in a defective manner. Should the guide roll jam against the bearing on the end opposite the automatic arrangement and carriage, the roll compensates in the usual manner for the disalignment at some other part in the machine, in the usual and intended manner. To overcome this difficulty, I have caused the journal on the guide roll 6 on the end opposite to the automatic arrangement and carriage to be set in a grooved bearing, or to extend the journal beyond the bearing on the opposite side of the automatic arrangement and carriage and place a safety collar on the said extended journal in such a way as to prevent the guide roll crowding against the front side as will be readily understood by reference to Figs. 10 and 11.

In Fig. 10 is shown the bearing of guide roll 6, wherein 45 is the journal of the type now in use at both ends of the roll. 46 designates the journal to run in the grooved bearing so that should the guide roll 6 be out of alignment, the shoulder of the bearing 45 cannot jam against the front side of the bearing.

Fig. 11 shows the guide roll 6, front side journal 47, back side journal at 48 extended, 49ª, safety collar 49, fastened securely to journal 48, causing the guide roll 6 to act in the same manner as described above in connection with Fig. 10.

While I have shown and described my invention and various features thereof, in a specific structure and arrangement, I wish it to be understood that many variations and changes in detail will readily occur to those skilled in the art without departing from the broad spirit and scope of my invention, as defined in the claims.

Therefore, what I claim as new and useful and of my own invention and desire to secure by Letters Patent is:—

1. The combination with a paper making machine, of means for dividing said machine, dropping one portion thereof and sliding the same under the other portion thereof substantially as shown and described.

2. The combination with a paper making machine, of means for telescoping said machine with one portion thereof suspended below the other portion substantially as and for the purpose described.

3. The combination with a paper making machine, including a couch end and a truck or breast end, and means for moving said truck or breast end relative to and toward said couch end substantially as and for the purpose described.

4. The combination with a paper making machine, including a couch end and a truck or breast end, and means for moving said truck or breast end under said couch end and means for suspending the same in its displaced position, substantially as and for the purpose described.

5. In a paper making machine, and in combination with a couch and truck or breast end thereof, means for supporting the truck or breast end, means for lowering said supporting means, and means for sliding said truck or breast end on said supporting means when the same is in its lowered position.

6. In a paper making machine, and in combination with the couch and truck or breast end thereof, means for supporting the truck or breast end, means for lowering said supporting means, and means for causing said truck or breast end to slide on said supporting means when the same is in its lowered position.

7. In a paper making machine, and in combination with the couch and truck or breast end thereof, rails for supporting the truck or breast end, means for lowering said rails, and means for sliding said truck or breast end on said rails when the same are in their lowered position.

8. In a paper making machine, and in combination with the couch and truck or breast end thereof, rails for supporting the truck or breast end, means for lowering said rails, and means for causing said truck or breast end to slide on said rails when the same reach their lowered position 9. In a paper making machine, and in combination with the couch and truck or breast end thereof, a frame at the truck or breast end, rails for supporting said truck or breast end, means for lowering said rails and the truck or breast end coincidently therewith, and means located on said frame for causing said truck or breast end to move on said rails when said rails reach a predetermined lowered position.

10. In a paper making machine and in combination with the couch and truck or breast end thereof, wheels carried by said truck, a breast end, cooperating rails for said wheels for supporting said truck or breast end, and provided with seats normally retaining said wheels in a fixed position relative thereto, means for lowering said rails and said truck or breast end, and means located in the path of said truck or breast end when being lowered, for unseating said wheels from said rail seats to allow the truck or breast end to be moved on said rails substantially as and for the purpose described.

11. In a paper making machine, and in combination with the couch and truck or breast ends thereof, and a support therefor, means for lowering the truck or breast end, and moving the same beneath the couch end, a wire truck, means for substituting the wire truck for said support, means for extending the wire on said wire truck into position on said machine, substantially as and for the purpose described.

12. In an apparatus for stringing a wire on a paper making machine without removing the rolls therefrom, a support for said machine, means for substituting an auxiliary support therefor to afford a clear passage of the wire over one end of said rolls, substantially as shown and described.

13. In a paper making machine, and in combination with the couch and truck or breast end thereof, rails for supporting the truck or breast end, chain hoists carried by the frame of the machine, and detachably secured to said rails for lowering the same, and means for sliding said truck or breast end on said rails when the same are in their lowered position.

14. The combination with the couch roll end, of a paper-making machine and the breast roll end, and table rolls interposed between the same normally in alignment with said breast roll, a bearing for said breast roll, a rail for supporting said bearing, means for lowering said rail, and means for moving said bearing on said rail when the same has been lowered.

15. The combination with the couch roll end of a paper making machine, and the breast roll end, and table rolls interposed between the same normally in alignment with said breast roll, a bearing for said breast roll, wheels carried by said bearing, rails cooperating with said wheels for supporting said bearing, means for retaining said bearing at a fixed point on said rails, means for lowering said rails, bearing and breast rolls, and means actuated by said roll reaching a predetermined point below its normal position for releasing said retaining means.

16. In a paper making machine, and in combination with a telescoping frame, means for supporting said frame, a wire truck, means for substituting said truck for said supporting means, and means for extending the wire of said wire truck around the rolls of said machine.

17. In a paper making machine, and in combination with the couch and breast rolls thereof, and the supporting frame therefor, a wire truck adapted to engage said frame, comprising a couch lift and a breast lift, means for placing the couch lift on the journal of said couch roll, means for placing the breast lift on the journal of said breast roll and means for stringing the wire of said wire truck over the said rolls.

18. The method of stringing a wire on a paper making machine which comprises dividing the machine into two parts, lowering one part and telescoping it under the other part, substituting a movable support for said machine, and removing the normal support therefor, substituting a support for the breast and couch rolls, said substituted support being within the loop of the wire to be strung, and finally extending the wire over the respective rolls, substantially, as shown and described.

19. Means for aligning the rolls of a paper making machine comprising foundation plates, bosses, permanently fastened to said foundation plates, in a position fixed by the proper alignment of the rolls, a table rail marks located on the table rail, and means for adjusting said rolls while in operation and means for locking said rolls in their adjusted position.

20. In a paper making machine, the combination with a truck end of savealls fastened permanently to the truck end and so positioned to retard the filter water passing through the forming wire, said savealls being provided with partitions, means for passing the water from one section to the next section of said savealls to thereby form a siphon.

21. In a paper making machine, and in combination with the couch and breast end thereof, of means for moving one of the rolls relatively to the others without dismounting the same, means for moving a portion of the machine relative to the remainder thereof, and means for breaking one face of the machine to permit the stringing of a wire thereover in an extended loop condition without interference by any part of said machine or the supports thereof.

22. The method of stringing a wire on a paper making machine which comprises moving the upper couch roll away from the breast end of the machine, moving one portion of the machine with respect to the other, extending the wire to be restrung in the form of an extended loop over said machine, and finally moving the movable portion of said machine back to its normal position.

23. The method of stringing a wire on a paper making machine which comprises moving the upper couch roll away from the breast end of the machine, moving one portion of the machine with respect to the other, extending the wire to be restrung in the form of an extended loop over said machine, and finally moving the movable portion of said machine back to its normal position, and moving said upper couch roll towards the breast end of the machine to a distance sufficient to impart the necessary tension to said wire.

JAMES K. DARBY.